United States Patent Office 3,666,355
Patented May 30, 1972

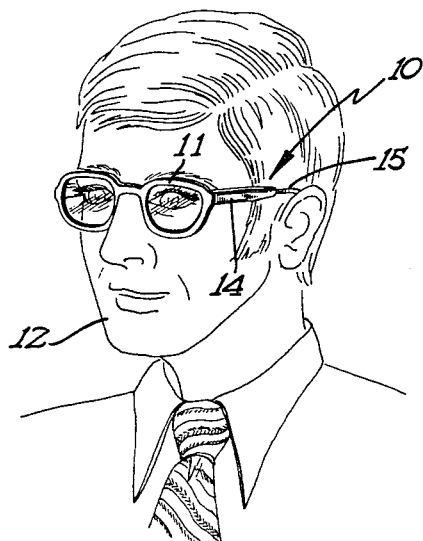
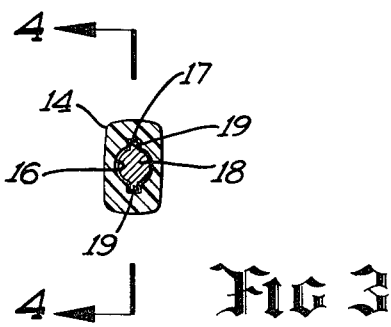
Fig 1
Fig 3
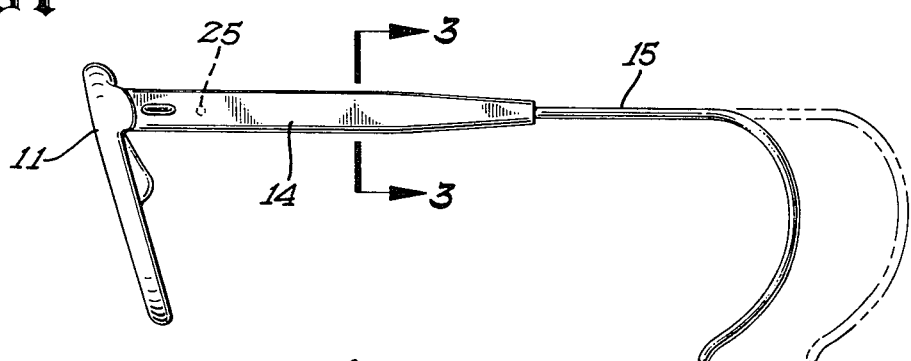
Fig 2
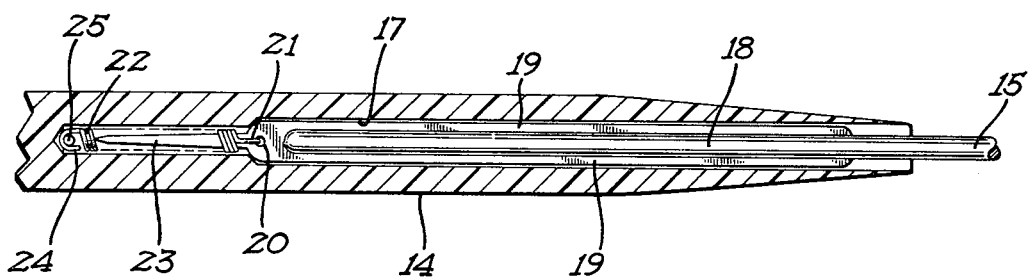
Fig 4
INVENTOR.
Arthur G. Griffith
BY L. A. MacEachron
ATTORNEY

3,666,355
EYEGLASS TEMPLE
Arthur G. Griffith, 1920 Drew Ave. S.,
Minneapolis, Minn. 55416
Filed Feb. 16, 1971, Ser. No. 115,168
Int. Cl. G02c 5/20
U.S. Cl. 351—118                    2 Claims

ABSTRACT OF THE DISCLOSURE

An eyeglass temple that has an ear piece that is longitudinally slidable in the portion of the temple that is secured to the lens supporting structure and is spring loaded by a tension that exerts its pull in a line along the longitudinal center of the temple body portion. The earpiece is an out of round shape and fits a similarly shaped but slightly larger cavity in the temple body portion so that the ear piece will not rotate.

BACKGROUND OF THE INVENTION

For people who need spectacles to see well, keeping them in place on the face has always been a nagging problem. Many solutions have been offered, but for the most part, spectacle wearers put up with a gradually loosening pair of spectacles that stay in place less and less well until the wearer finally gets to a shop where he can have them adjusted to stay in place more securely. There are even some structures being offered on the market now that are supposed to solve this problem. One of these applies latteral pressure to the head, but pressure exerted in that direction must be a good deal stronger than is necessary if the force culd be exerted in a straight line from the ear to the face. There have been a few such structures proposed but which are not currently on the market. One could speculate that they were not entirely satisfactory for some reason. Of the such structures that have been previously proposed and known to applicant, they are less than totally appealing in an aesthetic sense. It appears that they might not have been entirely satisfactory in a mechanical sense either. In any event none is currently available as far as applicant knows and that in spite of the fact that at least one of them is the property of a major spectacle manufacture. It is the object of this invention to provide a structure for holding eyeglasses in place well while retaining a very trim and acceptable appearance for the eyeglasses.

BRIEF DESCRIPTION

This invention provides an eyeglass templte that is resiliently elongate under tension. Basically, the structure consists of a temple body portion that has a longitudinal opening within which the end of the ear piece slidably fits. Both the earpiece end and the opening in the temple body portion are of an out of round cross section so that the ear piece cannot rotate with respect to the body portion of the temple. A suitable resilient tension means, such as a coil spring is secured to the inner end of the ear piece and a pin or the like extending through the temple body portion. This places the spring tension on the ear piece in a straight line along its length which makes it less likely to bind and not work well that would be the case with any spring which exerts its force off the center line of the ear piece. The spring, of course, need not be a very strong one. In fact, it should be a spring that is so mild in its force that it offers very little increase in spring tension over a range of about three-quarters of an inch of movement. The amount of change in the length of the temple to make a pair of spectacles change from a loose fitting pair to one that fits snugly is very little. Hence, the amount of movement provided by this structure not only makes for a snug fitting glasses, it also allows one size of temple fit a large number of different sized people. Furthermore, only the ear piece need be made differently to go into the next larger or smaller size range. The means by which all the advantages of this advanced form of spring loaded temple are achieved is best understood by reference to the accompanying drawings which are described briefly below.

THE DRAWINGS

FIG. 1 is a perspective view at a reduced scale of the spectacle temple in use on a pair of glasses;

FIG. 2 is a side elevation of a pair of spectacles using the invention with broken lines showing an adjusted position of the temples;

FIG. 3 is an enlarged cross section of the temple taken on the line and in the direction of the arrows 3—3 of FIG. 2, and FIG. 4 is a longitudinal section of a fragment of the temple to the scale of and taken on the line and in the direction of the arrows 4—4 of FIG. 3.

DETAILED DESCRIPTION

In FIG. 1, the invention is seen generally at 10 secured to the balance 11 of a pair of eyeglasses worn in the usual manner by a person 12. While the eyeglasses are not substantially different in appearance from any ordinary eyeglasses, the snug fit illustrated is maintained indefinitely by the spring tension between the body portion 14 of temple 10 and the ear piece 15.

In FIG. 2, the extension of the earpiece 15 relative to body 14 is shown by broken lines. Since a rather slight alteration in the length of the temple will make a remarkable difference in how snugly the eyeglasses fit, it is clear that the amount of movement shown will provide for a good fit on a large number of different people. To alter the size range of the eye glasses, only an ear piece 15 of greater or lesser length need be provided. The range of movement will remain constant.

The detailed construction of the spectacles can be seen best in FIG. 4. There the body portion 14 can be seen to have a central bore 16 with a channel 17 extending beyond the bore both top and bottom. In FIG. 3, the bore 16 is seen to be bisected by channel 17 vertically and longitudinally. Thus channel 17 has a greater extension than the bore vertically but lesser horizontally.

Ear piece 15 has a rod like center portion 18 with a flat portion 19 extending beyond the central rod like center portion 18. The ear piece, then, has a cross section configuration that is similar to the bore and channel of the body 14 but enough smaller to allow sliding movement.

Referring back to FIG. 4, the ear piece 15 is seen to have a hole 20 into which one end 21 of spring 22 is hooked. In the preferred form of the structure, the ear piece 15 has a tapered tang 23 that extends beyond the hole 20 and into the center of the coil of spring 22. Tang 23 prevents the spring 22 from sagging when it is not under tension. The other end 24 of spring 22 is secured to the body 14 by any suitable means such as pin 25 extending through the holes in body 14 and loop 24 of spring 22.

OPERATION

Commonly an invention is described under operation to show how it differs from predecessors in easy operation or result achieved. The unusual thing about these temples is that they produce a desirable snug fitting spectacle that is used in exactly the same way as a non-spring loaded eyeglass temple is used. This result flows from the structure that makes the temples non-rotatational with respect to body portion of the temple compared to the ear piece. All previous spring loaded spectacles called for an arrangement that permitted at least some rotational movement. When the temples are even slightly rotational, it is very difficult to put them on with one hand. When one is driving a car, holding something in one hand or otherwise required to one hand for something, it is highly desirable to be able to put eyeglasses on with one hand. In addition, the structure of these spring loaded eyeglass temples makes them very smooth working.

The structure desired to be patented is defined below in the claims as required by law.

What is claimed is:

1. An improved spectacle temple of the spring loaded type comprising:
   (A) a body member having a cavity in it comprising:
      (1) means defining a longitudinal bore, and
      (2) a channel that is horizontally narrower than the diameter of the core and vertically greater than the diameter of the bore,
   (B) an ear piece that slidingly fits in the channel of said body member, and
   (C) a resilient tension means secured to the body member near one end and near its axis and to said ear piece; whereby the ear piece is urged, yieldingly, into the body member.

2. The improved spectacle temple of claim 1 in which the resilient tension means is a coil spring and the ear piece has a tapered tang that extends into the coil of the coil spring.

References Cited
FOREIGN PATENTS 1,127,601   8/1956   France _____ 351—118

DAVID SCHONBERG, Primary Examiner

R. L. SHERMAN, Assistant Examiner

U.S. Cl. X.R.

351—111